United States Patent [19]

Berrigan, Jr.

[11] Patent Number: 5,310,484
[45] Date of Patent: May 10, 1994

[54] PREAERATION TREATMENT OF VOLATILE WASTEWATER COMPONENTS

[75] Inventor: John K. Berrigan, Jr., Wausau, Wis.

[73] Assignee: Zimpro Passavatn Environmental Sys., Rothschild, Wis.

[21] Appl. No.: 933,832

[22] Filed: Aug. 24, 1992

[51] Int. Cl.⁵ ............................................. C02F 3/12
[52] U.S. Cl. .................................. 210/616; 210/625; 210/627; 210/909
[58] Field of Search ............... 210/616, 624, 625, 626, 210/627, 909, 631

[56] References Cited

U.S. PATENT DOCUMENTS

| | | | |
|---|---|---|---|
| 3,806,448 | 4/1974 | Smith et al. | 210/625 |
| 3,904,518 | 9/1975 | Hutton et al. | 210/616 |
| 3,953,326 | 4/1976 | Reimann | 210/220 |
| 4,069,148 | 1/1978 | Hutton et al. | 210/616 |
| 4,269,714 | 5/1981 | Ishikawa et al. | 210/627 |
| 4,629,565 | 12/1986 | Hell et al. | 210/607 |
| 4,705,633 | 11/1987 | Bogusch | 210/614 |
| 4,705,634 | 11/1987 | Reimann et al. | 210/616 |
| 4,857,198 | 8/1989 | Meidl | 210/603 |
| 4,894,162 | 1/1990 | Cournoyer et al. | 210/603 |
| 4,912,316 | 8/1990 | Cooley | 210/616 |
| 4,919,815 | 4/1990 | Copa et al. | 210/616 |
| 4,961,854 | 10/1990 | Wittmann et al. | 210/626 |
| 5,106,498 | 4/1992 | Cournoyer et al. | 210/188 |

OTHER PUBLICATIONS

Weber, et al.; "Toxic Substance Removal in Activated Sludge and PAC Treatment Systems", EPA/600/-S2-86/045, Jun., 1986.

Qasin, S. R. et al.; "Comparative Performance of Convention, Anoxic-Aerobic, and Anoxic-Anaerobic-Aerobic Treatment Processes for Biological Nutrient Removal"; *46th Purdue Industrial Waste Conference Proceedings*, 1992, pp. 641-649; Lewis Publishers, Inc.

Brenner, A. et al.; "Treatment of a High Strength, Mixed Phenolic Waste in an SBR"; *Water Environment Research*, vol. 64, No. 2, 128-133, 1992.

*Primary Examiner*—Christopher Upton
*Attorney, Agent, or Firm*—Tipton L. Randall

[57] ABSTRACT

A process is described for aerobically treating wastewater containing volatile compounds to degrade the volatile compounds without liberating them to the atmosphere. Influent wastewater and return sludge from an aerobic biophysical wastewater treatment system are contacted in a preaeration zone where a minimum dissolved oxygen concentration of about 1 mg/l is maintained. In this preaeration zone a significant portion of the volatile compounds are biologically degraded. The minimum oxygen concentration in the preaeration zone is attained by prior aeration of the return sludge or by adding a small amount of oxygen to the preaeration zone. The mixture of influent wastewater and biophysical solids depleted of volatile compounds then flows to an aeration zone for further removal of pollutants.

8 Claims, 1 Drawing Sheet

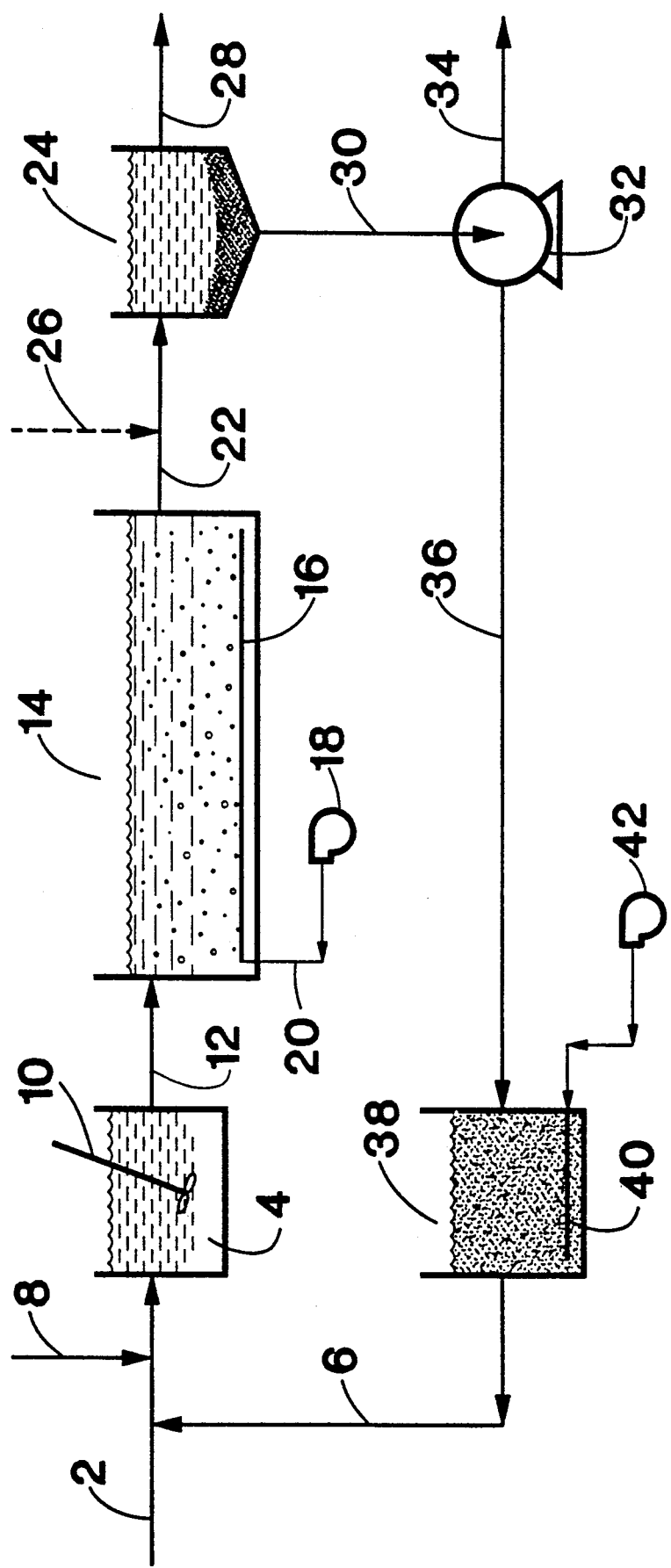
FIGURE

PREAERATION TREATMENT OF VOLATILE WASTEWATER COMPONENTS

BACKGROUND OF THE INVENTION

1. Field of the Invention

The present invention is concerned with a process for treating wastewater containing volatile compounds to degrade the volatile compounds without liberating them to the atmosphere.

2. Information Disclosure Statement

Aerobic biological treatment of wastewaters which contain volatile compounds can result in the emission of the volatile compounds into the environment. The volatile compounds are stripped from the aqueous phase during the process of transferring oxygen to the wastewater. Whether the aeration is accomplished by bubble or surface aeration makes little difference in the volatilization affect.

Studies by Weber and Jones, "Toxic Substance Removal in Activated Sludge and PAC Treatment Systems", EPA/600/S2-86/045, June, 1986 demonstrated that addition of powdered activated carbon to an aerobic biological system results in greatly reduced stripping of volatile compounds.

The addition of powdered adsorbent to the activated sludge process aeration basin constitutes the Powdered Activated Carbon Treatment (PACT®) process. Examples of such process are described in U.S. Pat. Nos. 3,904,518 and 4,069,148. The preferred powdered adsorbent is powdered activated carbon.

Meidl in U.S. Pat. No. 4,857,198 discloses treating a wastewater containing volatile compounds by air stripping the water to drive the compounds into the gas phase, then capturing the volatile compounds by contacting the stripping air with an aqueous mixture of biological solids and powdered adsorbent. The stripped wastewater is further treated by a biophysical aerobic process which in turn produces the biological solids and powdered adsorbent used to trap the volatile compounds.

Cournoyer et al. in U.S. Pat. No. 4,894,162 and No. 5,106,496 disclose a process and apparatus for purifying waste gases containing volatile compounds emanating from waste liquids by enclosing all tanks and basins from the influent of the wastewater treatment plant up to the aeration treatment zone and venting these gases to an aerobic digester and/or an aeration basin to biologically decompose or degrade the volatile compounds. The tank enclosures and extra piping are a significant additional expense.

The aeration of return sludge from a clarifier to an aeration zone in a biological treatment process has been described by Reimann in U.S. Pat. No. 3,953,326; by Hell et al. in U.S. Pat. No. 4,629,565; and by Bogusch in U.S. Pat. No. 4,705,633.

Applicant has discovered a process which overcomes the need for many of these added treatment steps and results in the biological decomposition or degradation of volatile compounds in wastewaters before treatment in an aerobic biophysical process. Governmental regulations may require covering the aeration zone of an aerobic treatment process to prevent escape of volatile compounds to the atmosphere, as well as treatment of the contained gases to remove volatile compounds. Applicant's invention removes the volatile compounds from the wastewater prior to aeration, thus overcoming the necessity to capture and treat aeration zone offgases resulting in significant savings in wastewater treatment costs.

SUMMARY OF THE INVENTION

It is an object of the invention to provide an aerobic process for treating wastewater contaminated with volatile compound and biologically degrade the volatile compounds before the wastewater is subjected to an aeration step.

The invention comprises a biophysical treatment process for wastewater containing at least one volatile organic pollutant, said process comprising aerating and mixing said wastewater with biological solids and powdered adsorbent in an aeration zone; separating a mixture of wastewater, biological solids and powdered adsorbent to produce a clarified liquid phase which is discharged from said process and a settled biophysical solids phase which is retained within the process, the improvement comprising the steps;

(a) contacting and mixing influent wastewater and retained biophysical solids phase in a preaeration contact zone, said wastewater in said preaeration contact zone maintained with a minimum dissolved oxygen concentration therein, whereby a significant portion of said volatile organic pollutant in said influent wastewater is biologically degraded; and (b) further treating a mixture of biophysical solids and influent wastewater depleted of volatile organic pollutant from said preaeration contact zone in said aeration zone by aeration and mixing for additional pollutant removal by said biophysical treatment process.

The invention applies either to a continuous flow biophysical treatment system or to a batch operated biophysical treatment system. The preferred adsorbent is powdered activated carbon.

BRIEF DESCRIPTION OF THE DRAWINGS

FIG. 1 is a flow diagram of a continuous flow biophysical system to which the invention is applied.

DESCRIPTION OF THE PREFERRED EMBODIMENTS

Referring to FIG. 1, wastewater contaminated with at least one volatile compound is introduced through a conduit 2 into a preaeration mixing zone 4. The wastewater in the conduit 2 is mixed with an aerated biophysical return sludge from a conduit 6. The aerated return sludge, essentially free of volatile compounds and other pollutants, comes from an aerobic biophysical system described below. An adsorbent such as powdered activated carbon, may be added to the mixture via a conduit 8 to make up for adsorbent wasted or lost from the system. The influent wastewater and the aerated return sludge are mechanically mixed by a mixing means 10 within the preaeration mixing zone 4 for a selected hydraulic detention time or duration, while the volatile compounds are biologically degraded. It is important to maintain aerobic conditions within the preaeration mixing zone 4 to allow the biodegradation to occur. Some additional oxygen may be required as will be described later. The size, and consequently the hydraulic detention time (HDT) or duration of residence therein, of the preaeration mixing zone 4 is kept to a minimum, roughly 5% to 15% of the size (or HDT) of the aeration zone 14.

The influent wastewater plus biophysical sludge solids from the preaeration mixing Zone flow via a conduit 12 to an aeration zone 14 where mixing and aeration is continuously provided by aeration means 16, such as an air sparge, supplied with air from a blower 18 via a conduit 20. The wastewater is further purified within the aeration zone by a combination of adsorption and biological degradation.

The mixture of biophysical solids and wastewater flow from the aeration zone 14 via a conduit 22 to a clarifier 24. A small dose of polymer may be added to the mixture via a conduit 26 ahead of the clarifier 24 to assist in solids settling. The clarifier 24 produces a purified wastewater phase which exits the system by an effluent conduit 28 and a settled solids phase which flows via a conduit 30 to a pump 32. A portion of the settled solids phase may be wasted to control system solids via a conduit 34 while all or a portion of the settled solids phase is returned to the head of the system via a conduit 36 to maintain the desired concentration of biological solids and powdered adsorbent therein, as well as to biologically degrade the volatile compounds in the influent.

The return sludge portion of the solids flows to a return sludge aeration zone 38 fitted with an aeration means 40 supplied by a blower 42. The sludge is aerated to produce a significant level of dissolved oxygen therein. The aerated return sludge then flows via the conduit 6 to be mixed with influent wastewater in this continuous flow system.

The following describes an alternative embodiment of the invention. The sequencing batch reactor (SBR) or batch mode of wastewater treatment is a simple, single tank process comprising a timed sequence of equalization, aeration and liquid/solids separation as opposed to continuous flow processes which employ a space sequence of the above functions. The batch mode offers greater flexibility of operation and control in that it is easier to adjust a time period than to change a space to redistribute process functions.

The normal steps involved in operation of a biophysical treatment batch process for a single tank is as follows.

1. A tank filled with wastewater, biological solids and powdered adsorbent is mixed and aerated for a specific time period termed the "react" step.
2. Aeration and mixing cease and the solids are allowed to settle and separate from clarified liquid. This is termed the "settle" step.
3. Decanting of the clarified liquid to give a treated effluent, separated from the settled solids phase. This is termed the "decant" step.
4. Allowing the settled solids phase to stand "idle", an optional step.
5. Filling of the tank with influent wastewater, termed the "fill" step.
6. Repeat steps 1-5.

Applicant's invention as applied to the batch operated system comprises aerating and mixing the settled solids phase of biological solids and powdered adsorbent, after the decant or idle step, to produce a significant dissolved oxygen concentration therein. Aeration then ceases but mixing continues as influent wastewater containing volatile compounds fills the batch operated tank, in step 5. The mechanical mixing of influent wastewater and preaerated solids phase allows biodegradation of the volatile compounds to occur without the possibility of stripping which can result if aeration were also used. After a specified mixing period for wastewater and biophysical solids, where the volatile compounds are biologically metabolized, aeration commences and the steps of the batch process are completed to the point where a settled solids phase is again produced, step 3.

The volatile compound which are removed by the above treatment process include aromatic hydrocarbons such as benzene, toluene, the xylenes and ethylbenzene.

Higher concentrations of volatile compounds in wastewater may deplete the dissolved oxygen in the aerated return sludge and necessitate the transfer of additional oxygen to the preaeration zone mixture of wastewater and return sludge to maintain a minimum dissolved oxygen concentration therein. A minimum dissolved oxygen concentration of about 1 mg/l or greater is required. This can be accomplished by providing a small volume of oxygen containing gas, preferably pure oxygen gas, to the preaeration mixing zone. The small volume of oxygen gas required can be bubbled slowly through the mixing return sludge and wastewater so as to maintain that minimum dissolved oxygen concentration required for the biological degradation of the volatile compounds therein, yet not strip any of the volatile compounds.

Extremely high concentrations of volatile compounds in the raw wastewater require proportionately greater volumes of oxygen gas to be added to the preaeration zone. To ensure that the volatile compounds are not liberated to the atmosphere by the oxygen gas transfer, the preaeration zone may require a covered top and treatment of any offgases. Covering the preaeration zone and concurrent offgas treatment will be more economical than covering and offgas treatment for the entire aeration zone due to the shorter hydraulic detention time and thus the smaller size of the preaeration zone.

EXAMPLE

A pilot scale system similar to that shown in the FIGURE was operated at a petroleum refinery to treat wastewater contaminated with volatile organic compounds. The recycle sludge from the clarifier 24 was taken directly to the conduit 6 via the conduit 36 without aeration. Raw influent wastewater and recycled sludge each flowed into the preaeration mixing zone 4 at 120 ml/min. The preaeration mixing zone was 14 liters in volume, resulting in a wastewater HDT of about 58 minutes. The HDT for the aeration zone was 14 hours. The preaeration mixing zone 4 was equipped with a small air sparge which was available for maintaining a minimal dissolved oxygen residual in that preaeration zone.

The raw wastewater, the recycle sludge and the combined peraertion effluent were each analyzed for benzene. Liquid and the solids phases were analyzed separately and benzene content of each determined. Solids were collected by filtration and thermally desorbed for benzene analysis. The first test was performed under anoxic preaeration chamber conditions with no aeration. The chamber effluent benzene concentration is the weighted sum of the benzene content of the liquid and the benzene content of the solids. The majority of the effluent benzene was adsorbed on the solids but not destroyed. Thermal desorption of the solids released the adsorbed benzene for analysis.

The second test was performed with a minimal amount of aeration (25 std. ft³/hr/1000 ft³) used to mix the two streams and maintain a small dissolved oxygen residual within the preaeration chamber. Again the chamber effluent was analyzed as above. Much lower amounts of benzene were found by thermal desorption of the solids portion. The analytical results for the two tests are shown in TABLE 1.

From the foregoing description, one skilled in the art can easily ascertain the essential characteristics of the invention and, without departing from the spirit and scope thereof, make various changes and modifications to adapt it to various usages.

TABLE 1

| | BENZENE ANALYSES | | | |
|---|---|---|---|---|
| | ANOXIC CHAMBER | | AERATED CHAMBER | |
| DATE | June 5 | June 10 | June 16 | June 17 |
| Raw Feed, mg/l | 27.3 | 57.1 | 29.4 | 25.0 |
| Recycle Sludge, mg/l | 0.14 | 0.8 | 0.24 | 0.32 |
| Average Influent, mg/l | 13.7 | 29.0 | 14.8 | 12.7 |
| Chamber Effluent, mg/l | 13.0 | 21.3 | 3.1 | 1.5 |

I claim:

1. In a biophysical treatment process for wastewater containing at least one volatile organic pollutant, said process comprising aerating and mixing said wastewater with biological solids and powdered adsorbent in an aeration zone; separating a mixture of wastewater, biological solids and powdered adsorbent to produce a clarified liquid phase which is discharged from said process and a settled biophysical solids phase which is retained within the process, the improvement comprising the steps;
    (a) contacting and mixing influent wastewater and retained biophysical solids phase in a preaeration contact zone, said wastewater in said preaeration contact zone maintained with a minimal residual dissolved oxygen concentration therein, whereby a significant portion of said volatile organic pollutant in said influent wastewater is biologically degraded without being stripped from said wastewater; and
    (b) further treating a mixture of biophysical solids and influent wastewater depleted of volatile organic pollutant from said preaeration contact zone in said aeration zone by aeration and mixing for additional pollutant removal by said biophysical treatment process.

2. In a continuous flow biophysical treatment process for wastewater containing at least one volatile organic pollutant, said process comprising aerating and mixing said wastewater with biological solids and powdered adsorbent in an aeration zone; flowing a mixture of wastewater, biological solids and powdered adsorbent to a solids separation zone, and settling said mixture to produce a clarified liquid phase which is discharged from said process and a settled biophysical solids phase which is returned to an upstream point in the process, the improvement comprising the steps;
    (a) aerating and mixing said settled biophysical solids phase exterior said settling zone to establish a significant dissolved oxygen concentration therein,
    (b) contacting and mixing influent wastewater and aerated biophysical solids phase in a preaeration contact zone upstream of said aeration zone, said wastewater in said preaeration contact zone maintained with a minimal residual dissolved oxygen concentration therein, whereby a significant portion of said volatile organic pollutant in said influent wastewater is biologically degraded without being stripped from said wastewater; and
    (c) flowing a mixture of biophysical solids and influent wastewater depleted of volatile organic pollutant from said preaeration contact zone to said aeration zone for aeration with mixing and additional pollutant removal by said biophysical treatment process.

3. A process according to claim 2 wherein said adsorbent is powdered activated carbon.

4. A process according to claim 2 wherein said contacting and mixing step (b) in said preaeration contact zone occurs for a duration of about 5% to about 15% of the aeration and mixing step (c).

5. A process according to claim 2 wherein said volatile pollutant is an aromatic hydrocarbon.

6. A process according to claim 5 wherein said volatile pollutant is one or more compounds selected from the group benzene, toluene, ethyl benzene or xylene.

7. A process according to claim 2 wherein said contacting and mixing of biophysical solid and wastewater of step (b) is accompanied by passing a minimal volume of oxygen-containing gas through said wastewater and biophysical solids in the preaeration zone to maintain a minimal dissolved oxygen concentration therein.

8. A process according to claim 7 wherein said oxygen containing gas is air, enriched air or essentially pure oxygen.

* * * * *